July 4, 1967

J. KOLBE 3,329,233

VEHICLE

Filed Jan. 24, 1966

INVENTOR.
JOACHIM KOLBE
BY
Andrus & Starke
ATTORNEYS

INVENTOR.
JOACHIM KOLBE
BY
Andrus & Starke
ATTORNEYS

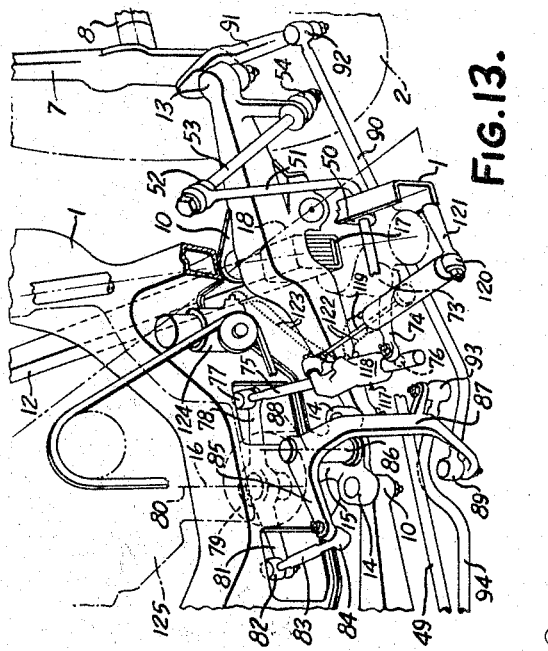

United States Patent Office 3,329,233
Patented July 4, 1967

3,329,233
VEHICLE
Joachim Kolbe, 5126 Haskell Ave.,
Encino, Calif. 91316
Filed Jan. 24, 1966, Ser. No. 522,566
10 Claims. (Cl. 180—79.2)

This invention relates to steering mechanisms for vehicles having the superstructure supported by banking arms for inward banking on turns. Such vehicles are hereinafter referred to as curve-bank cars. The term banking arm, as introduced and defined for banking suspensions, is set forth in Patent No. 2,576,686, granted Nov. 27, 1951, to the present inventor.

Later reorganizations and simplifications of structure and progressive expansions of its functions have been disclosed in a number of U.S. patents granted to the present inventor, all referring to curve-bank cars and including by way of example U.S. Patent No. 2,581,030, issued Jan. 1, 1952, and referred to as steering control for banking arm vehicles; U.S. Patent No. 2,760,785, issued Aug. 28, 1956, and referred to as sway bar operated banking and introducing roll banking arms; U.S. Patent No. 2,739,658, issued Mar. 27, 1956, and referred to as king-pin banking hinge vehicle; U.S. Patent No. 2,820,646, issued Jan. 21, 1958, and referred to as dual turn shackles; and U.S. Patent No. 3,181,883, issued May 4, 1965, and referred to as multi-turn cushions.

This invention is directed to the problem of steering the wheels of selected types of curve-bank cars without interference from the movement of the superstructure during banking and under consideration of the additional corrective functions of the suspension linkage with regard to steering influences as described in particular in Patent No. 3,181,883, cited above.

The invention is based on the discovery that, where a centrally located longitudinally extending superstructure carried lever is present for the support of the inner ends of the front suspension link and spring assemblies for independently supported front wheels, such lever can be employed to support an essentially standard, lowly placed steering linkage, comprising two steering arms and two steering tie rods and a steering bell crank which is carried by said lever and activated in accordance with this invention by a newly introduced "Banking Drag Link" arranged to absorb banking influences on steering.

The principal object of this invention is to provide a steering mechanism which is coordinated to the movement of the wheel suspension linkage of curve-bank cars.

Another object is to have much of the steering linkage supported by the curve-bank car suspension linkage directly and located at points which by themselves provide the maximum compensating effect for the banking movement of the superstructure relative to the running gear during curve ride.

Another object is to disclose the incorporation and selected location of a banking drag link serving as a nullifier of undesirable effects of the roll banking motion of the superstructure on vehicle steering in curve-bank cars.

Another object is to provide such a mechanism applicable to curve-bank cars of varying designs or embodiments of suspension structure and wherein the connections between the superstructure and the steering control arms of the corresponding wheels may be located favorably with respect to all related steering and banking movements and to space as well as weight requirements.

Another object is to provide a steering construction applicable to vehicles comprising roll banking arms and king-pin banking hinges as defined in Patent No. 2,739,658, referred to above, said roll banking arms supporting the vehicle superstructure and interconnected by a tie-rod assembly extending between the front pair and the rear pair of said roll banking arms, said tie-rod assembly designed to maintain equal lateral mass displacement of the front end and the rear end of the superstructure in response to side forces, securing thereby improved steering even where the primary roll centers differ in height location.

Another object is to provide a substantial variety in design for the location of the steering gear and its housing on the superstructure independent of the position of the banking tie-rod and eliminating interference of banking movement of the superstructure with the steering.

Another object is to provide a steering linkage for curve-bank cars in which each of the functions of steering, banking compensation, and oscillation freedom for the steered wheels is assigned to a separate tie-rod to thereby secure a more accurate steering for the vehicle.

In carrying out the invention a steering bell crank lever, having its output lever arm linked to the steering arms of the two opposite front wheels of the vehicle, is pivotally carried by banking linkage on a vertical axis always disposed centrally intermediate the two wheels, and is actuated by a parallelogram linkage system connected to its input lever arm and to the operator's steering control mechanism. The parallelogram linkage system utilizes as its fourth leg a link joining the supporting pivots of the two parallel levers.

The invention provides a steering system that can be disposed in a substantially free space beneath the superstructure and does not require space in the height of the mass center of the vehicle, the roll center for banking, as does the steering system disclosed in U.S. Patent No. 3,181,883.

The accompanying drawings illustrate various embodiments of the invention and the manner of designing the same to fulfill the objects referred to.

In the drawings:

FIG. 10 is a geometry lay-out showing the axes of all related parts in all straight ahead, curve-banked, and wheel-steered positions, and selected combinations thereof illustrated in order to facilitate comparisons of the positions for the linkages shown in FIGS. 3 to 9;

Figure 1:
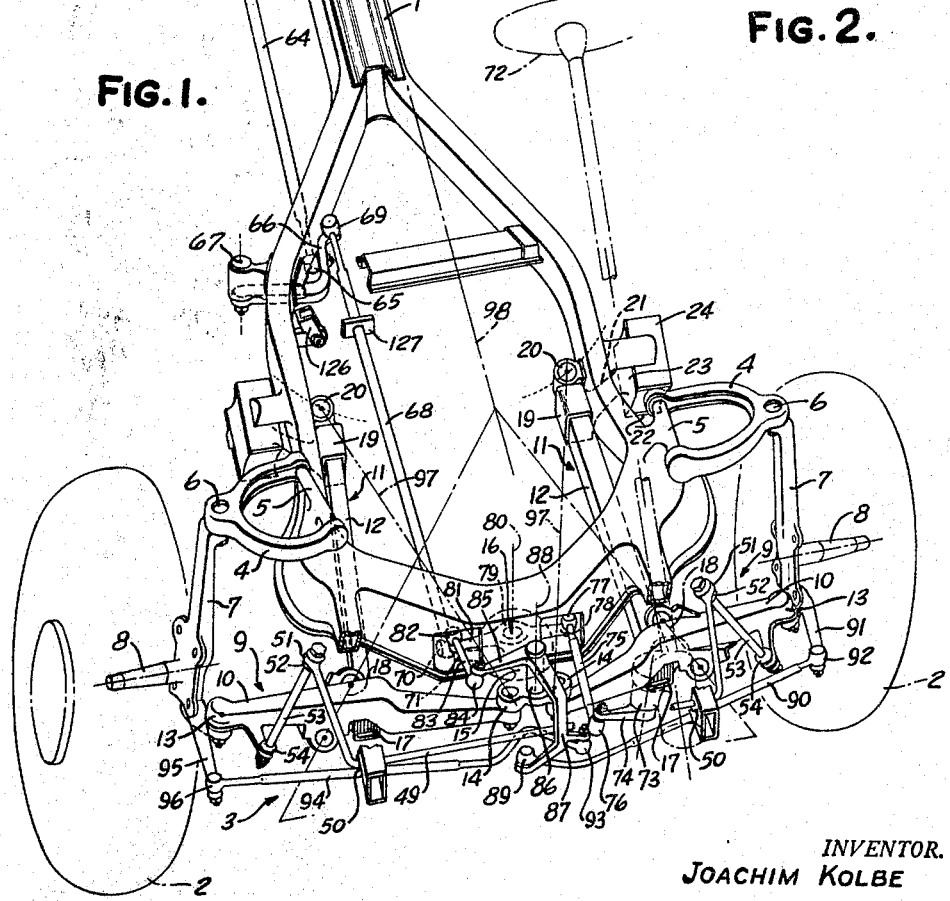
FIGURE 1 is a perspective view of a vehicle chassis embodying the invention and showing the superstructure in a normal upright position.

FIG. 12 is a schematic plan view of the steering linkage in a curve-bank car wherein the hand wheel operated steering gear carrying the pitman arm is located a selected distance behind the transverse, vertical plane extending through the front wheel spindles; and FIG. 13 is a detailed enlarged perspective view of the steering linkage shown in FIG. 1 with a suggested location for the parts and connections comprising a power assist unit arranged to facilitate the steering of the vehicle for the driver.

While the subject matter of this invention relates to improved steering layouts for curve-bank cars, the running gear of all resiliently supported automobiles in general exerts its own influence on their steered position during curve ride, unfortunately in a negative sense, interfering with and confusing for the driver's intentions.

Curve-bank car suspensions, characterized by built-in controlled lateral shifting between vehicle frame and running gear will automatically correct this condition or at least greatly reduce this interference with steering.

A complete graphic and descriptive presentation of a curve-bank car chassis is therefore given in FIG. 1 as described hereinafter, with the newly devised steering linkage incorporated in accordance with the invention and its relationship to the selected curve-bank car running gear explained.

FIG. 1 illustrates a vehicle body or superstructure having a chassis or body support frame 1 and supported by wheels 2 on the road. The wheels 2 are arranged in pairs, one pair at the front end and the other pair at the rear end of the vehicle. The wheels of each pair are disposed on opposite sides of the superstructure and are equally spaced from the longitudinal vertical center plane of the vehicle.

The front wheels 2 and their corresponding wheel carriers 3 form a front pair of effective multi-turn cushion controlled roll banking arm supporting the front end of the superstructure.

Each front wheel carrier 3 comprises an upper control arm 4 pivotally attached to the frame 1 by the substantially longitudinally extending hinge 5 and connected by the ball and socket joint 6 to a wheel supported member 7 which also serves as a king pin member and carries the wheel spindle 8. In addition, each carrier 3 has a lower suspension arm unit 9 comprising a transversely extending leg 10 and a longitudinally extending leg 11. Leg 11 also serves as a vehicle main support torsion spring for the corresponding share of the weight of the vehicle, since the leg 11 comprises the torsion leaf spring bundle 12.

The transversely extending leg 10 of each lower suspension arm unit 9 is pivoted at its outer end by the universally movable ball and socket joint 13 to the wheel supported spindle member 7, and at its inner end by the universally movable ball and socket joint 14 to a longitudinally extending lever 15 pivoted by a substantially vertically placed pivot 16 to the frame 1. Lever 15 serves both transversely extending legs 10 as a common inner end support.

The longitudinally extending legs 11 each comprise the torsionally stressed leaf spring bundle 12 anchored at its forward end into the anchor box 17 which forms a hinged fork shaped to carry the hinge 18 which serves as a king pin banking hinge for that section of the vehicle.

The hinge 18 may be constructed by placing two ball and socket joints spaced apart along its hinge axis line.

King pin banking hinges and their functions are disclosed and described in Kolbe Patent No. 2,739,658, issued March 27, 1956.

The backward end of each torsional leaf spring bundle 12 located at either side of the vehicle is anchored into the corresponding anchor box 19 supported and secured by a ball and socket joint 20 to the frame 1. Each anchor box 19 forms an integral part with an outwardly extending support arm 21. The outer end of arm 21 forms a carrier plate 22 extending longitudinally with its surface inclined preferably about 30° to the road and with its forward end placed lower than its backward end while the vehicle is viewed in side elevation, and extending substantially horizontally in transverse direction.

The carrier plate 22 carries the multi-turn cushion 23 which rests against the frame supported plate 24, which in turn extends substantially parallel to the carrier plate 22.

The positioning of the multi-turn cushion 23 in an inclined position results in improved resistance against loss of torsional deflection of the corresponding leaf spring bundle 12 during the banking turn of the superstructure, as described in Kolbe Patent No. 3,181,883, referred to above.

The rear axle carriers 3' illustrated in FIG. 1 each comprise an upper torque rod or link 25 connected at its forward end to a bracket 26 on frame 1 by a universally movable joint 27, and at its backward end by means of a universally movable joint 28 and axle bracket 29 to the rigid axle housing 30 respectively.

Each carrier 3' further comprises a longitudinally extending torsion leaf spring bundle 32 serving as a lower suspension arm and connected at its forward end through axle box 33 and arm 34 by the ball and socket joint 35 to the frame 1, and at its backward end through the anchor box 36 and arm by the ball and socket joint 37 to the axle housing 30.

Multi-turn cushions 38 are placed a selected distance away from and extend with their support surfaces perpendicular to effective roll banking axes 39 which intersect the centers of the corresponding ball and socket joints 35. The lower carrier plates 40 for the multi-turn cushions 38 are supported by the arms 41 extending outwardly and rearwardly at approximately 45° from the anchor boxes 33 located at the forward ends of the torsional leaf spring bundles 32.

The multi-turn cushions 38 are supported against upper support plates 42 which are resting against brackets 43 carried by the frame 1.

The multi-turn cushions 44, resting against the axle housing 30, are also placed a selected distance away from and extend with their support surfaces perpendicular to effective axle banking hinge axes 45 which intersect the ball joints 37 and constitute the geometric center lines for the relative travel path of the related connecting members between frame 1 and the rearward ends of the wheel carriers 3'. Each multi-turn cushion 44 is supported by the corresponding lower carrier plate 46 which in turn is connected by the support arm 47 to the anchor box 36. The multi-turn cushion 44 rests against the upper support plate 48 extending rearwardly from the axle housing 30. The support plate 48 extends substantially parallel to the carrier plate 46 and confines the cushion therebetween.

The multi-turn cushions or rubber blocks 44 are inclined as described for the blocks 23 arranged in the front of the vehicle and function in a similar manner.

A sway bar 49 is attached in the front of the vehicle to the frame 1 by the bearings 50. The outer ends of the sway bar 49 form longitudinally extending sway bar arms 51 which are connected by pivotal or rubber bearings 52 to inclined sway bar shackles 53. The shackles 53 are connected by pivotal or rubber bearings 54, which are spaced farther apart than the upper shackle bearings 52 to the outer ends of the transversely extending legs 10 of the lower front suspension arm units 9.

In the rear of the vehicle, a similar sway bar 55 may be added and is illustrated as being attached by suitable bearings to the frame 1. The sway bar 55 has longitudinally extending arms 57 on either end, which are connected by upper pivotal or rubber bushings 58 to inclined shackles 59 with lower pivotal or rubber bearings 60 also spaced further apart than the upper pivots 58, connecting the shackles 59 to the rear axle housing 30.

The front and rear wheels carriers 3 and 3' are connected to operate in unison in curve-banking, as shown in earlier disclosures such as Kolbe U.S. Patent No. 2,788,984.

For this purpose the rear suspension forward anchor box 33 located on the right side of the vehicle in the embodiment shown in FIG. 1 carries an arm 61 extending inwardly with the ball and socket joint 62 on its end placed in or near the theoretical axis 63 which extends through the rear frame supported ball and socket joint 35 and through the approximate center of the multi-turn cushion 38. This arm 63 constitutes part of a tie, provided in effect between the front and rear pairs of wheels 2 to secure proper track holding for the vehicle.

A longitudinally extending tie-rod 64 carries at its rear end the ball and socket joint 62 and at its forward end a ball and socket joint 65 which is carried by the substantially horizontally and transversely extending lever 66 disposed to turn about a substantially vertically extending pivot 67 supported by the frame 1.

A second longitudinally extending tie-rod 68 carrying at its rear end the ball and socket joint 69 which is also supported by the lever 66 and carrying at its forward end the ball and socket joint 70, interconnects the lever 66 and the transversely extending lever 71 which forms a bell-crank portion of the centrally located lever 15 in the front of the vehicle.

FIG. 1 further illustrates the steering assembly arranged according to this invention. A steering hand wheel 72 operates a steering gear unit 73 carried by the frame 1 and supporting a pitman arm 74 extending transversely of the direction of the vehicle. A substantially longitudinally extending drag link 75 is connected by a ball and socket joint 76 on its forward end to the outer end of the pitman arm 74 and at its rearward end by a ball and socket joint 77 to the outer end 78 of one of a transversely extending two-arm lever 79 which pivots about the centrally located substantially vertically extending axis 80 of hinge 16 carried by the frame 1.

The other outer end 81 of the lever 79 is connected by a ball and socket joint 82 to a substantially longitudinally extending drag link 83, hereinafter called banking drag link, which in turn is connected by the ball and socket joint 84 to the sidewardly extending lever arm 85 of the bell crank 86 which comprises also the longitudinally extending lever arm 87 and which pivots about the vertically extending bell crank pivot 88 in turn supported by the longitudinally extending centrally placed suspension arm 15 at its outer end.

The lever arm 87 carries on one side of its downwardly extending forward section the ball and socket joint 89 supporting the steering tie-rod 90 connected to the steering arm 91 by the ball and socket joint 92, and carries on the other side of its downwardly extending forward action the ball and socket joint 93 supporting the steering tie-rod 94 connected to the steering arm 95 by the ball and socket joint 96. The steering tie-rods 90 and 94 are shaped to secure swinging freedom for an overlapping condition, necessitated by the steering geometry and desirable since the inner ball joints 89 and 93, located near the longitudinally and vertically extending center plane of the vehicle can thereby be placed in the extensions 97 of the respective connecting axis lines of the suspension ball joints 20 and 14, thereby excluding any interference between steering and wheel oscillation in that area.

Figure 2:
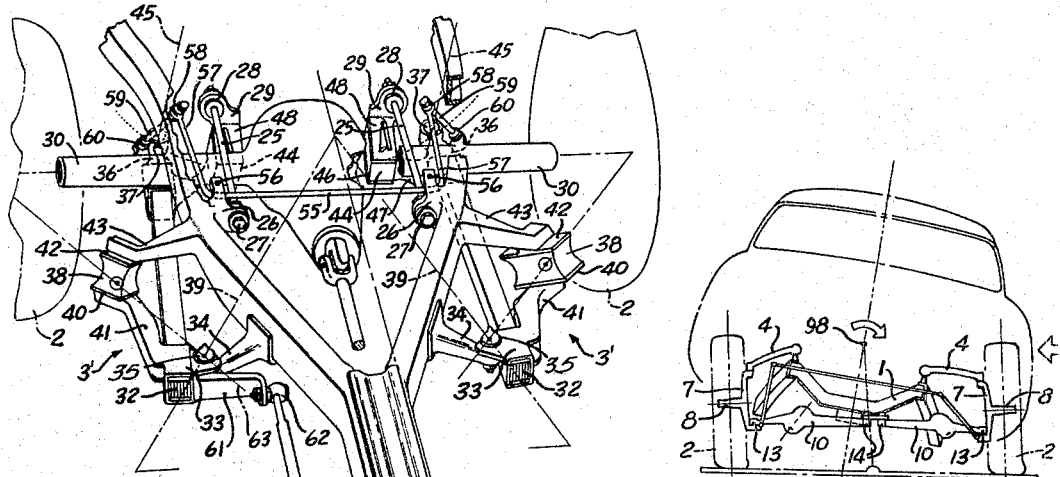
FIG. 2 is a schematic front elevation of the vehicle having the superstructure mounted as shown in FIG. 1 and turned into a roll banked position.

In the operation of the curve-bank superstructure and suspension mechanism illustrated in FIG. 1 and partly shown as moved into the curve-banked position in FIG. 2, the right hand front sway bar shackle 53 has erected itself and lifted the right hand side of the superstructure supported by its frame 1, turning it around the pre-designed effective banking roll center 98 away from the road, while the left hand front sway bar shackle 53 has the left hand side of the superstructure pulled downwardly, also turning it around the banking roll center 98.

Similar turn and shift motions take place throughout the mechanism as described in detail in Kolbe U.S. Patent 3,181,883, referred to above.

Figure 3:
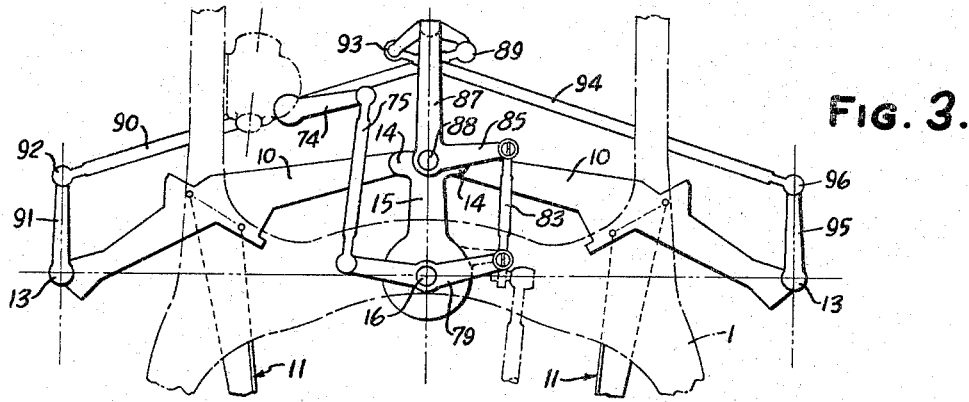
FIG. 3 is a schematic plan view of the steering linkage and selected members or parts of the vehicle suspension linkage and frame, with the relative positions of the linkages shown for a vehicle traveling straight ahead on a horizontal plane.

FIG. 3 illustrates the vehicle front end linkage for the non-steer, non-curve bank condition, with identical numerals applied as those applied in FIG. 1 in this and all other figures of the application.

Figure 9:
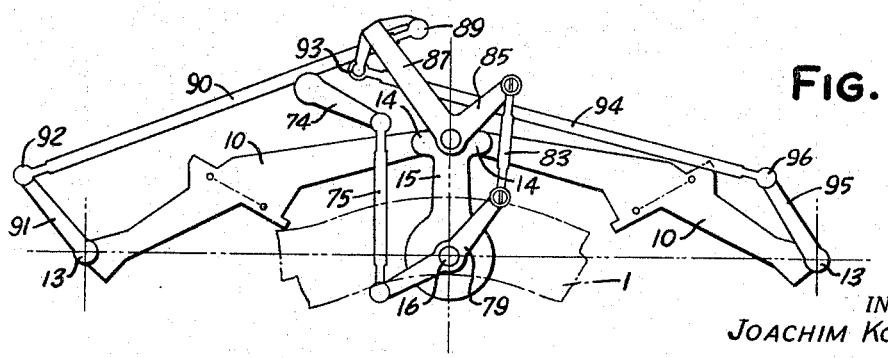
FIG. 9 is a schematic plan view of the linkages shown in FIG. 3 but positioned for a vehicle steered to the left in a non-travel position, such as occurs during parking, whereby no curve-banking occurs with the steering geometry properly maintained.

The gliding of the vehicle superstructure into the curve-banked position will in most cases be caused by the driver operating the steering hand wheel 72 to steer the vehicle into, for instance, a left turn. The related wheel steering linkage thereby shifts as follows: the outer end of the pitman arm 74 pushes the steering drag link 75 backwardly. The double lever 79 transforms this motion into a forward motion for the banking drag link 83, turning the steering bell crank 86 to shift the tie-rods 90 and 94 to the left, to steer the wheels 2 into the desired turn. This position is shown in FIG. 9.

Figure 5:
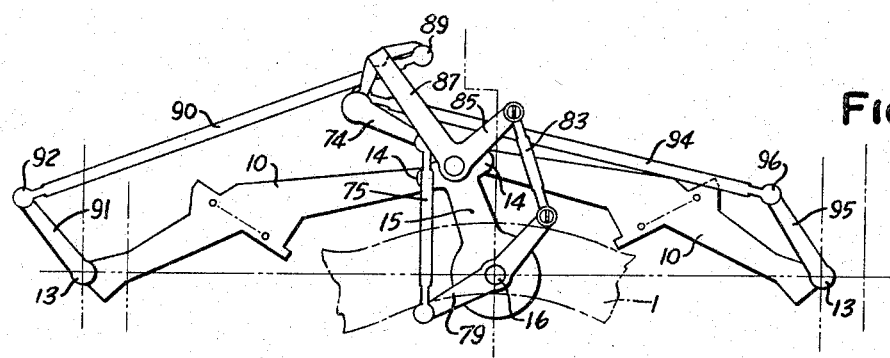
FIG. 5 is a schematic plan view of the linkages shown in FIG. 3 but positioned for a vehicle steered while negotiating a turn to the left and curve-banked to the left.

If now the vehicle begins to move forwardly and centrifugal force begins to develop, the superstructure will glide into the curve-bank position turning about its banking roll center 98. The superstructure carried longitudinally extending centrally located lever arm 15 will take a position inclined to the direction of the vehicle, but while its frame supported end carried by hinge 16 will shift sidewardly, the steering position of the wheels 2 will stay unchanged due to the motion compensating travel of the banking drag link 83. This position is shown in FIG. 5 for the maximum left turn plus left curve-bank position.

Figure 4:
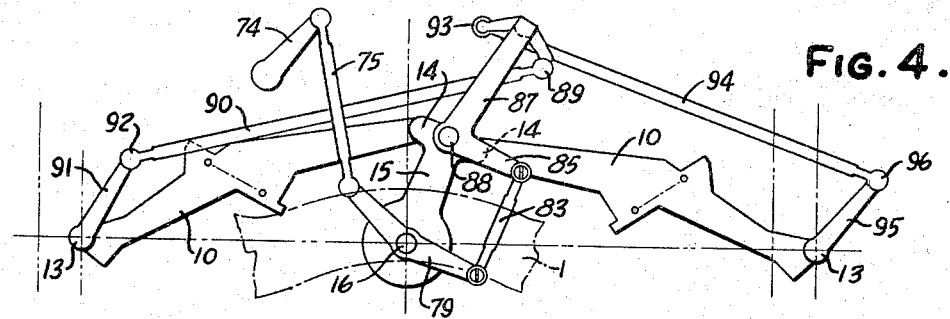
FIG. 4 is a schematic plan view of the linkages shown in FIG. 3 but positioned for a vehicle steered while negotiating a turn to the right and curve-banked to the right.

FIG. 4 similarly illustrates the vehicle front end linkage, but for a full right-steer right-bank condition.

Figure 6:
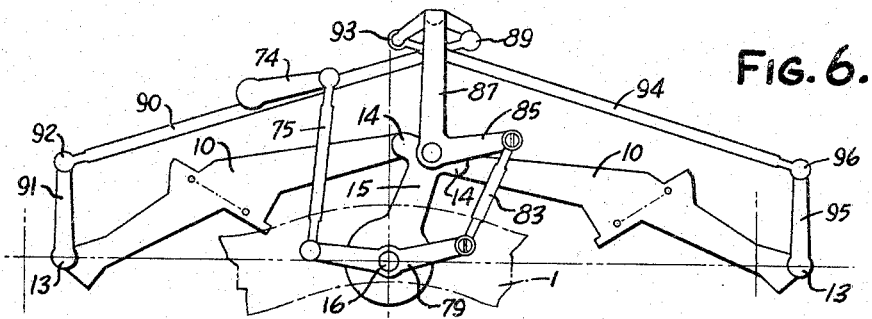
FIG. 6 is a schematic plan view of the linkages shown in FIG. 3 but positioned for a vehicle traveling straight ahead on the right side of a heavily crowned road and therefore moved into a left-banked position while maintaining its straight ahead steered position.

FIG. 6 similarly illustrates the vehicle front end linkage for a non-steer, full bank position such as occurs when the vehicle travels along a side-sloped surface with its low side to the left of the vehicle.

Figure 7:
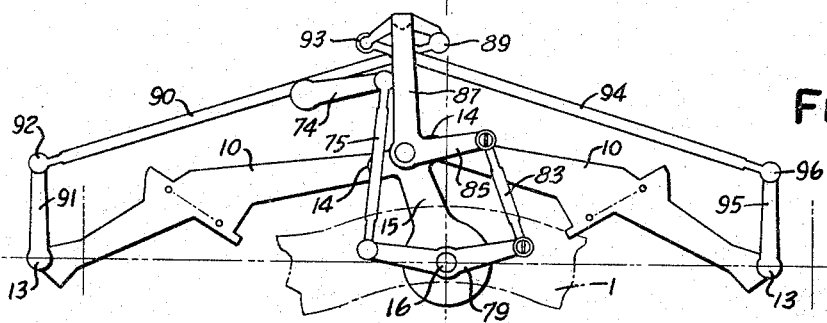
FIG. 7 is a schematic plan view of the linkages shown in FIG. 3 in a right banked position for the banking linkage and straight ahead position for the steering linkage.
Figure 8:
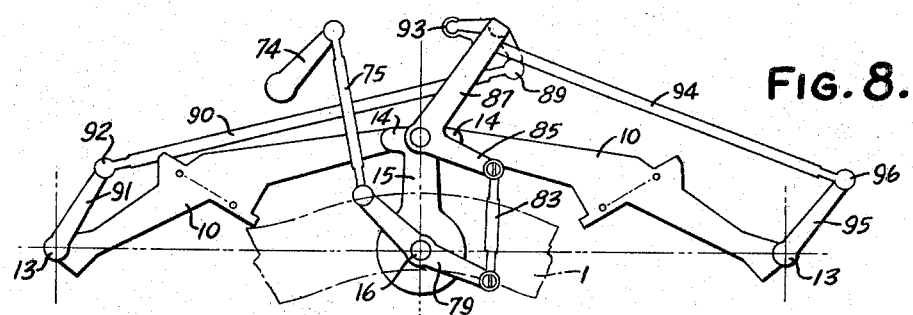
FIG. 8 is a schematic plan view of the linkages shown in FIG. 3 but positioned for a vehicle steered to the right in a non-travel position, such as occurs during parking, whereby no curve-banking occurs with the steering geometry properly maintained.

FIG. 7 illustrates the vehicle front end linkage for a non-steer, full bank position such as occurs when the vehicle travels along a side-sloped surface with its low side to the right of the vehicle, and FIG. 8 illustrates the vehicle front end linkage for a full-steer, non-bank position similar to FIG. 9 but steered to the right.

The linkage motion-studies illustrated in FIGS. 3 to 9 are based on the over-all geometry layout for the members shown in their axial relationships in FIG. 10. The travel line 99 of the banking drag link 83 is marked by end arrows 100 for the banking motions, with the travel lines 101, 102, and 103 respectively shown for added steering out of the non-bank left-bank and right-bank positions, marked by end arrows 104 for steering left and right out of non-bank position, and arrow 105 for left-bank left-steer and end arrow 106 for right-bank right-steer position. The combinations full left-bank right-steer and full right-bank left-steer do not occur in practical travel. Their theoretical travel lines 107 and 108 respectively are shown in small zigzag outline increasing in width towards the end of travel.

Figure 11:
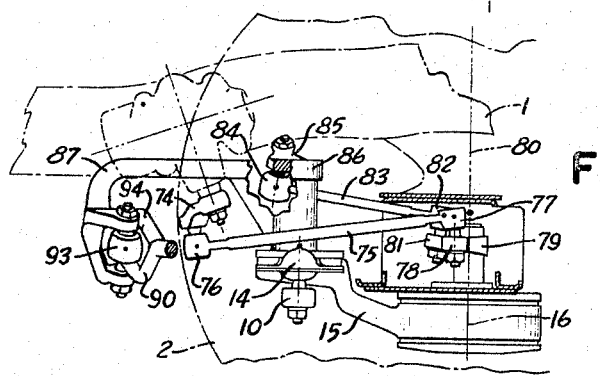
FIG. 11 is a side elevation of the central part of the linkage structure shown in FIG. 3 with parts sectioned and disclosing the relative height relationships between the linkages illustrated.

FIG. 11 illustrates the front end linkage arranged in accordance with this invention as it appears in side elevation, disclosing the height relationships of the linkage members, and in particular the mounting of the steering bell crank 86 on the centrally located lever 15 of the banking suspension and between the ball and socket joints 14.

In FIG. 12, the steering handwheel operated steering gear unit 109 is placed a selected distance behind the transverse vertical plane intersecting the wheel spindles 8 of the vehicle. The pitman arm 110 carried by the gear unit 109 supports the rear end of the steering drag link 111, connected to the arm 110 by the ball and socket joint 112. The forward end of the draglink 111 is connected by the ball and socket joint 113 to the transversely extending arm 114 which pivots about the centrally located vertically extending hinge 115 and also supports the rearward end of the banking drag link 83 which connects to the remaining steering linkage as described above.

The operation of the linkage as induced by the banking drag link 83 is identical to that illustrated in FIGS. 3 to 9, although shown in mirror-like outline in order to adjust to the relocation of the steering gear unit.

FIG. 13 illustrates the location of a hydraulic power assist assembly to facilitate the steering of the vehicle for the driver. In general, such power assist can be incorporated into the frame-mounted gear units 73 or 109 and designed to have the respective pitman arms 74 or 110 exert the added pressure on the linkage as disclosed according to the invention. However, where a separate piston unit 116 and control valve unit 117 have to be placed within the linkage itself, the steering drag link 75, as illustrated in FIG. 13, preferably carries the control valve unit 117, with its housing 118 actually becoming a part thereof, and also pivotally supports the piston rod end 119 of the piston unit 116, while the other end of the unit, which for practical or clearance reasons is disclosed as the piston housing end 120, is pivotally connected to the frame bracket 121. The hydraulic connecting lines 122 extending between the control valve unit 117 and the piston unit 116 will be short, as will be the connecting lines 123 extending between the hydraulic pump 124, mounted on the vehicle engine 125, and the control valve unit 117.

Incorporated into the vehicle as disclosed, the power assist assembly will not interfere in its operation with the free position-taking of the superstructure with regard to either vertical or horizontal banking sway.

As illustrated in FIG. 1, and similar in function to the locking device illustrated in FIG. 15 of U.S. Patent 3,181,883, referred to above, a locking lever 126 pivotally connected to the frame 1 and overlapping in its downward position the line-up plate 127 carried by the longitudinal tie-rod 68 serves to maintain the superstructure in a fixed central position in order to allow general adjustment or correction of front wheel alignment which in curve-bank cars of the class described depends on an exact longitudinally extending position of the support lever 15.

In the construction indicated the steering mechanism functions free of influence by the banking and vertical oscillation movements of the superstructure. The tie between the front and rear banking arms is designed to provide a greater banking shift of the superstructure for the rear end of the car than for the forward end of the car, which tends to simplify the problem of steering.

The geometric arrangement enables steering of the wheels wholly independent of banking movements.

Various modes of carrying out the invention are contemplated as being within the scope of the following claims particularly pointing out and distinctly claiming the subject matter which is regarded as the invention.

I claim:

1. In a banking vehicle of the class described having a superstructure, a pair of front roll banking arms and a pair of rear roll banking arms disposed to support each corresponding end of the superstructure upon a pair of wheels, each roll banking arm including an upper wheel suspension arm, and means interconnecting the roll banking arms of the corresponding pair, said interconnecting means comprising for the front pair of roll banking arms a superstructure hinged substantially centrally located lever arm, each front roll banking arm including a lower wheel suspension arm comprising a rigid transversely and a resilient longitudinally extending leg and a king pin banking hinge pivotally interconnecting the forward end of said longitudinally extending leg to said transverse leg and disposed to control the turn of the roll banking arm about said king pin banking hinge, the rearward end of each logitudinally extending leg being connected to the superstructure by a support ball joint and a multi-turn cushion placed a selected distance from said support ball joint, and the transversely extending leg having its outer end carried by a steerable wheel and its inner end pivotally carried by said hinged interconnecting means; a wheel steering linkage operated by a frame supported driver controlled gear unit carrying a transversely extending pitman arm, a frame supported transversely extending lever comprising two arms spaced a selected distance away from said pitman arm, a steering bell crank pivotally mounted on the forward end of said centrally located lever arm, a steering drag link pivotally connected to and longitudinally extending between said pitman arm and said transversely extending lever, a banking drag link pivotally connected to and substantially longitudinally extending between said transversely extending lever and the transversely extending arm of said steering bell crank, two steering tie rods, each pivotally connected at its inner end to the longitudinally extending arm of said steering bell crank and at its outer end to a wheel spindle member supported substantially longitudinally extending wheel steering arm, said steering linkage geometrically arranged to steer the related wheels of the vehicle independently of changes in the roll-bank position of the superstructure.

2. The combination of claim 1 wherein said banking drag link is disposed substantially parallel to the centrally located longitudinally extending lever supporting the inner ends of the front roll banking arms and wherein said banking drag link shifts substantially parallel to said centrally located lever and remains parallel thereto at all times.

3. The combination of claim 1 wherein the inner ends of the steering tie-rods are pivotally supported by the steering bell crank on sides opposite of the longitudinal vertical center plane of the vehicle from their outer ends.

4. The combination of claim 1 wherein the inner ends of the steering tie rods are supported by the centrally located steering bell crank by means of ball and socket joints located substantially along and in the general horizontal plane of the inner front lower wheel oscillation control arm axes.

5. The combination of claim 1 wherein the steering gear unit carrying the pitman arm is mounted in front of the vertical transverse plane intersecting the wheel spindles of the vehicle, and the lever supporting the rearward ends of the steering drag link and the banking drag link is constructed as a transversely extending centrally hinged two arm layer with each arm pivotally supporting the rearward end of one of said drag links.

6. The combination of claim 1 wherein the steering gear unit carrying the pitman arm is mounted behind the vertical transverse plane intersecting the wheel spindles of the vehicle, and the lever pivotally supporting the forward end of the steering drag link and the rearward end of the banking drag link is constructed as a transversely extending single arm lever with its substantially vertically extending hinge mounted to the vehicle frame and its free end carrying the pivots of said drag links.

7. The combination of claim 1 and a steering power assist assembly having a control valve and a power cylinder, wherein the steering drag link comprises the control valve unit and pivotally supports one end of the power cylinder unit of the steering power assist assembly and wherein the other end of the longitudinally positioned power cylinder is pivotally connected to the vehicle frame and means to supply power fluid to said assembly at all times.

8. In a banking vehicle of the class described having a superstructure, a pair of front roll banking arms and a pair of rear roll banking arms disposed to support each corresponding end of the superstructure upon a pair of wheels, each roll banking arm including an upper wheel suspension arm, means interconnecting the roll banking arms of the corresponding pair, said interconnecting means comprising for the front pair of roll banking arms a superstructure hinged substantially centrally located lever arm, each front roll banking arm including a lower wheel suspension arm comprising a rigid transversely and a resilient longitudinally extending leg and a king pin banking hinge pivotally interconnecting the forward end of said longitudinally extending leg to said transverse leg and disposed to control the turn of the roll banking arm about said king pin banking hinge, the rearward end of each longitudinally extending leg being connected to the superstructure by a support ball joint and a multi-turn cushion placed a selected distance from said support ball joint, and the transversely extending leg having its outer end carried by a steerable wheel and its inner end pivotally carried by said hinged interconnecting means, each of said rear roll banking arms comprising a generally longitudinally and horizontally extending torsion spring, a universally movable joint connecting the forward end of said torsion spring to the superstructure near the torsion axis of the spring, a universally movable joint connecting the rear end of said torsion spring and the vehicle axle structure near the torsion axis of the spring, a lever arm carried by each end of said torsion spring, a multi-turn cushion disposed between the forward lever arm and the superstructure and subject to compression by said torsion spring in response to the vertical load of the superstructure, and a multi-turn cushion disposed between the rear lever arm and the axle structure and subject to compression by said torsion spring in response to the vertical load of the superstructure, both of said multi-turn cushions being yieldable longitudinally and laterally to guide the superstructure into a banked position; a wheel steering linkage operated by a frame supported driver controlled steering gear unit carrying a transversely extending pitman arm, a frame supported transversely extending lever comprising two arms spaced a selected distance away from said pitman arm, a steering bell crank pivotally mounted on the forward end of said centrally located lever arm, a steering drag link pivotally connected to and longitudinally extending between said pitman arm and one of the arms of said transversely extending lever, a banking drag link pivotally connected to and substantially longitudinally extending between the other of the arms of said transversely extending lever and the transversely extending arm of said steering bell crank, two steering tie rods each pivotally connected at its inner end to the longitudinally extending arm of said steering bell crank and at its outer end to a wheel spindle member supported substantially longitudinally extending wheel steering arm, said steering linkage geometrically arranged to steer the related wheels of the vehicle independent of changes in the roll bank position of the superstructure.

9. The combination of claim 8 wherein a tie is provided to co-ordinate the amounts of lateral banking shift between the respective front and rear pairs of roll banking arms, said tie comprising a front laterally extending arm forming a bell crank with said superstructure hinged substantially centrally located longitudinally extending lever arm, a rear laterally extending arm forming a bell crank with one of the longitudinally extending torsion spring structures, a third laterally extending arm supported by the superstructure and spaced intermediate said front and said rear laterally extending arms, a longitudinally extending forwardly placed tie rod pivotally connecting with its corresponding ends the outer ends of said front laterally extending arm and said third laterally extending arm, a longitudinally extending rearwardly placed tie-rod pivotally connected at one end to said rear laterally extending arm and at the other end to said third arm near its outer end, and wherein said tie secures a larger lateral banking shift for the rear pair of roll banking arms relative to the superstructure than for the front pair of roll banking arms in order to keep the superstructure in its exact longitudinal direction independent of the difference in height of the front and rear suspension roll centers, resulting in an improved position of said front wheel steering linkage.

10. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, an effective universal joint comprising a support ball joint and a multi-turn cushion spaced a selected distance away from said support ball joint, said effective universal joint connecting each longitudinally extending leg at its inner end to the superstructure, an inclined king pin banking hinge connecting each longitudinally extending leg at its outer end to the corresponding transverse leg intermediate the ends of the latter, a pivotal support for the inner ends of said transverse legs pivotally carried by the superstructure, and a ball and socket joint connecting the outer end of each transverse leg to the corresponding wheel spindle member, each rear wheel carrier extending between the superstructure and the outer end of a rigid axle housing and comprising a torsion spring attached at each end to an effective universal joint constructed by means of a support ball joint and a multi-turn cushion spaced a selected distance away from said support ball joint, whereby said effective universal joints for each arm are arranged to rotate relative to each other during wheel oscillation and wherein said torsion spring constitutes a leaf spring bundle, at least one stabilizer bar carried by the superstructure and connected by inclined shackles to the corresponding wheel carriers, a wheel steering linkage operated by a frame supported driver controlled gear unit carrying a transversely extending pitman arm, a frame supported transversely extending lever comprising two arms spaced a selected distance away from said pitman arm, a steering bell crank pivotally mounted on the forward end of said centrally located pivotal support lever arm, a steering drag link pivotally connected to and longitudinally extending between said pitman arm and one of the arms of said transversely extending lever, a banking drag link pivotally connected to and substantially longitudinally extending between the other of the arms of said transversely extending lever and the transversely extending arm of said steering bell crank, two steering tie-rods each pivotally connected at its inner end to the longitudinally extending wheel steering arm, said linkage being geometrically arranged to steer the wheels of the vehicle independent of changes in the roll bank position of the superstructure.

References Cited
UNITED STATES PATENTS

| | | | |
|---|---|---|---|
| 2,739,658 | 3/1956 | Kolbe | 180—73 |
| 2,760,785 | 8/1956 | Kolbe. | |
| 2,820,646 | 1/1958 | Kolbe. | |
| 3,181,883 | 5/1965 | Kolbe. | |

BENJAMIN HERSH, *Primary Examiner.*

J. H. BRANNEN, *Assistant Examiner.*